United States Patent
Carothers

(10) Patent No.: US 8,763,117 B2
(45) Date of Patent: Jun. 24, 2014

(54) SYSTEMS AND METHODS OF DNS GREY LISTING

(75) Inventor: Matthew Edwin Carothers, Dunwoody, GA (US)

(73) Assignee: Cox Communications, Inc., Atlanta, GA (US)

( * ) Notice: Subject to any disclaimer, the term of this patent is extended or adjusted under 35 U.S.C. 154(b) by 308 days.

(21) Appl. No.: 13/411,500

(22) Filed: Mar. 2, 2012

(65) Prior Publication Data

US 2013/0232574 A1    Sep. 5, 2013

(51) Int. Cl.
*H04L 29/06*      (2006.01)
(52) U.S. Cl.
USPC .......................................................... 726/22
(58) Field of Classification Search
CPC ............. H04L 61/1511; H04I 63/1408; G06F 2221/2119; G06F 21/55
USPC .......................................................... 726/22
See application file for complete search history.

(56) References Cited

U.S. PATENT DOCUMENTS

| | | | |
|---|---|---|---|
| 2006/0015722 A1* | 1/2006 | Rowan et al. ................. | 713/166 |
| 2006/0277264 A1* | 12/2006 | Rainisto ..................... | 709/206 |
| 2008/0270544 A1* | 10/2008 | Howe .......................... | 709/206 |

* cited by examiner

*Primary Examiner* — Jason Gee
(74) *Attorney, Agent, or Firm* — Benjamin A. Balser; Balser & Grell IP Law, L.L.P.

(57) ABSTRACT

To circumvent being blacklisted by an ISP, some viruses use a domain name generator algorithm or a domain generator algorithm (DGA). In an example, the DGA may use the current date and time to generate a random domain name based on the date. So for a given date, the botnet registers a particular domain in order to control the Trojan horse virus. The domain name that the botnet uses typically changes every day, which helps circumvent blacklisting. To counteract that, the disclosed systems and methods of DNS greylisting place a domain name in a grey list for a time period, for example a day, that the domain is resolved by the ISP. The first time the ISP experiences a customer trying to contact a particular domain, the ISP prevents the domain from resolving. After the time period (for example, 24 hours) expires, the domain is allowed to resolve normally.

17 Claims, 3 Drawing Sheets

SYSTEMS AND METHODS OF DNS GREY LISTING

TECHNICAL FIELD

The present disclosure is generally related to computer networking and, more particularly, is related to computer viruses.

BACKGROUND

A botnet is a collection of compromised computers connected to the Internet (each compromised computer is known as a 'bot'). When a computer is compromised by an attacker, there is often code within the malware that commands it to become part of a botnet. The "botmaster" or "bot herder" controls these compromised computers via standards based network protocols such as IRC and http.

Initially, bots (short for "robots") were useful tools designed by computer programmers as a virtual individual that could remain idle in an IRC channel, and perform tasks during the user's absence. Soon after the release of the first IRC bot, a few worms which exploited vulnerabilities in IRC clients began to appear. Infected computers, or newly formed "bots", were then used to steal passwords, log keystrokes, and act as a proxy server to conceal the attacker's identity.

Botnets were used for both recognition and financial gain. The larger the botnet, the more 'kudos' the person ('bot herder') orchestrating the botnet could claim in underground online communities. The bot herder can also 'rent out' the services of the botnet to third parties, usually for sending out spam messages or performing a denial of service attack against a remote target. Due to the large numbers of compromised machines within the botnet, huge volumes of traffic (either email or denial of service) can be generated. However, in recent times, the volume of spam originating from a single compromised host has dropped in order to thwart anti-spam detection algorithms—a larger number of compromised hosts send a smaller number of messages in order to evade detection by anti-spam techniques.

Botnets have become a significant part of the Internet, albeit increasingly hidden. Due to most conventional IRC networks taking measures and blocking access to previously-hosted botnets, controllers must now find their own servers. Often, a botnet will include a variety of connections and network types. Sometimes a controller will hide an IRC server installation on an educational or corporate site where high-speed connections can support a large number of other bots. There are heretofore unaddressed needs with previous anti-virus botnet solutions.

SUMMARY

Example embodiments of the present disclosure provide systems of DNS grey listing. Briefly described, in architecture, one example embodiment of the system, among others, can be implemented as follows: a server, the server comprising memory in which are stored instructions for: receiving a domain name system (DNS) request comprising a hostname; determining if the hostname is in a grey list cache or a white list cache; and if the hostname is not in the grey list cache or the white list cache, then saving the hostname to the grey list cache and sending a false reply to the DNS request.

Embodiments of the present disclosure can also be viewed as providing methods for DNS grey listing. In this regard, one embodiment of such a method, among others, can be broadly summarized by the following steps: receiving a domain name system (DNS) request comprising a hostname; determining if the hostname is in a grey list cache or a white list cache; and if the hostname is not in the grey list cache or the white list cache, then saving the hostname to the grey list cache and sending a false reply to the DNS request.

DETAILED DESCRIPTION

Figure 1:
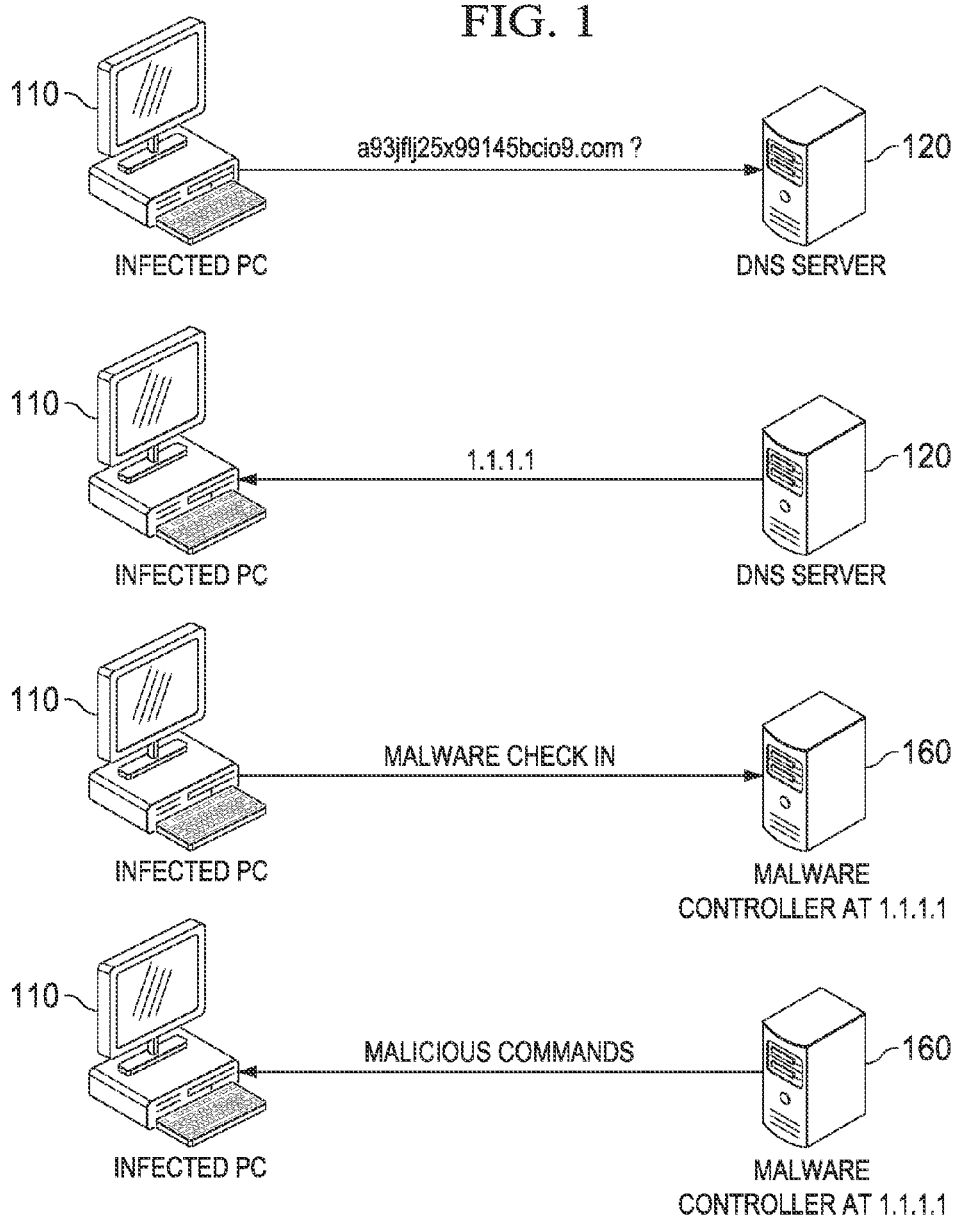
FIG. 1 is a system block diagram of an example of a DNS lookup by a computer infected with a virus.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Computers are recruited into a botnet by running malicious software. This may be achieved by a drive-by download exploiting web browser vulnerabilities, or by tricking the user into running a Trojan horse program, for example, possibly in an email attachment. As with any malware, there is no general rule; the software controls the computer and can do anything. It will typically install modules, which allow the computer to be commanded and controlled by the botnet's owner. The Trojan may delete itself, or may remain present to update and maintain the modules. A public warez scene may be used to spread malicious software for the recruitment of new bots. Some websites have the malicious software embedded in all their available downloads.

While botnets are often named after their malicious software name, there are typically multiple botnets in operation using the same malicious software families, but operated by different criminal entities. While the term "botnet" can be used to refer to any group of bots, such as IRC bots, this word is generally used to refer to a collection of computers (called zombie computers) which have been recruited by running malicious software.

A botnet's originator (aka "bot herder" or "bot master") can control the group remotely, usually through a means such as an IRC, and usually for nefarious purposes. Individual programs may manifest as IRC "bots". Often the command-and-control takes place via an IRC server or a specific channel on a public IRC network. This server is known as the command-and-control server ("C&C"). Though rare, more experienced botnet operators program their own command protocols from scratch. The constituents of these protocols may include a server program, a client program for operation, and the program that embeds itself on the victim's machine (bot). All three of these programs may communicate with each other over a network using an encryption scheme for stealth and protection against detection or intrusion into the botnet network.

A bot typically runs hidden and uses a covert channel (e.g. the RFC 1459 (IRC) standard, Twitter, or IM) to communicate with its C&C server. Generally, the perpetrator of the botnet has compromised a series of systems using various tools (exploits, buffer overflows, as well as others). Newer bots can automatically scan their environment and propagate themselves using vulnerabilities and weak passwords. Generally, the more vulnerabilities a bot can scan and propagate through, the more valuable it becomes to a botnet controller community. The process of stealing computing resources as a result of a system being joined to a "botnet" is sometimes referred to as "scrumping."

Botnet servers will often liaise with other botnet servers, such that a group may contain twenty or more individual cracked high-speed connected machines as servers, linked together for purposes of greater redundancy. Actual botnet communities may consist of one or several controllers that rarely have highly-developed command hierarchies between themselves; they rely on individual friend-to-friend relationships.

The architecture of botnets has evolved over time, and not all botnets exhibit the same topology for command and control. Depending upon the topology implemented by the botnet, it may make it more resilient to shutdown, enumeration, or command and control location discovery.

A botnet operator sends out viruses or worms, infecting ordinary users' computers, whose payload is a malicious application—the bot. The bot on the infected PC logs into a particular C&C server (often an IRC server, but, in some cases a web server). A spammer purchases the services of the botnet from the operator. The spammer provides the spam messages to the operator, who instructs the compromised machines via the IRC server, causing them to send out spam messages. Botnets are exploited for various purposes, including denial-of-service attacks, creation or misuse of SMTP mail relays for spam (see Spambot), click fraud, spamdexing and the theft of application serial numbers, login IDs, and financial information such as credit card numbers.

The botnet controller community features a constant and continuous struggle over who has the most bots, the highest overall bandwidth, and the most "high-quality" infected machines, like university, corporate, and even government machines.

Typical attack types include denial-of-service attacks, adware, spyware, email spam, click fraud, access number replacement, fast flux, worm and scareware. In denial-of-service attacks, multiple systems autonomously access a single Internet system or service in a way that appears legitimate, but accesses much more frequently than normal use, and causes the system to become busy. Adware exists to advertise some commercial entity actively and without the user's permission or awareness, for example, by replacing banner ads on web pages with those of another content provider.

Spyware is software which sends information to its creators about a user's activities—typically passwords, credit card numbers and other information that can be sold on the black market. Compromised machines that are located within a corporate network can be worth more to the bot herder, as they can often gain access to confidential information held within that company. E-mail spam involves e-mail messages disguised as messages from people, but are either advertising, annoying, or malicious in nature.

Click fraud involves the user's computer visiting websites without the user's awareness to create false web traffic for the purpose of personal or commercial gain. Access number replacements involve a botnet operator replacing the access numbers of a group of dial-up bots to that of a victim's phone number. Given enough bots partaking in this attack, the victim is consistently bombarded with phone calls attempting to connect to the internet. Having very little to defend against this attack, most are forced into changing their phone numbers (land line, cell phone, etc.).

Fast flux is a DNS technique used by botnets to hide phishing and malware delivery sites behind an ever-changing network of compromised hosts acting as proxies. Brute-forcing remote machines services such as FTP, SMTP and SSH. With worms, the botnet is designed to infect other hosts automatically. Scareware can install the virus or the virus can install a scareware. For example users can be forced to buy a rogue anti-virus to regain access to their computer.

If a machine receives a denial-of-service attack from a botnet, few choices exist. Given the general geographic dispersal of botnets, it may be difficult to identify a pattern of offending machines.

The botnet server structure mentioned above has inherent vulnerabilities and problems. For example, if one was to find one server with one botnet channel, often all other servers, as well as other bots themselves, will be revealed. If a botnet server structure lacks redundancy, the disconnection of one server will cause the entire botnet to collapse, at least until the controller(s) decide on a new hosting space. However, more recent IRC server software includes features to mask other connected servers and bots, so that a discovery of one channel will not lead to disruption of the botnet.

For example, a trojan horse virus infects a customer PC and the trojan horse virus attempts to contact a control server to receive instructions on what to do. Many trojan horse viruses look up a fixed domain name, which makes the trojan horse virus vulnerable. If that domain gets taken down, then the botnet can no longer control the trojan horse virus. The ISP may easily blacklist the domain and prevent the trojan horse viruses from reaching it. To circumvent being blacklisted by the ISP, some trojan horse viruses have begun to use a domain name generator algorithm or a domain generator algorithm (DGA). In an example, the DGA may use the current date and time to generate a random domain name based on the date. So for a given date, the bot herder registers a particular domain in order to control the Trojan horse virus.

The domain name that the botnet uses typically changes every day, which helps circumvent blacklisting. To counteract that, the disclosed systems and methods of DNS greylisting place a domain name in a grey list for a time period, for example a day, that the domain is resolved by the ISP. In an example embodiment, the first time the ISP experiences a customer trying to contact a particular domain, the ISP prevents the domain from resolving. In an example embodiment, the customer is directed to a website page that explains that the website they are trying to access looks suspicious, so they have been temporarily blocked from accessing it. In an example embodiment, the ISP may offer to release the domain through an authentication method. If a user is legitimately trying to go to a site that has been misclassified by the system, the user can get it to resolve. After the time period (for example, 24 hours) expires, the domain is allowed to resolve normally.

Analysis of the domains (such as N-gram analysis, for example) may improve the process. If every domain name is greylisted the first time it is resolved, false positives may occur—every legitimate new domain would get greylisted. There are several different heuristics that may be applied to reduce the number of false positives, one of which is n-gram analysis. Another method is to determine if the domain has a leading "www" in front of the domain. Few botnets use "www.domain." The botnet domain is normally just a long string of random characters. Other methods include determining how long the domain name has been registered, to whom the domain is registered, or other DNS data such as what is designed to live on the domain, what IP the domain references, or if the domain is referencing to a foreign country. Additionally, among other methods of improving the accuracy of the system, a determination may be made regarding whether the domain has a mail record, mail exchanger, MX record, etc.

In an example embodiment, in resolving the domain, first, a DNS lookup is performed. The long, randomly generated string is examined and the IP for that domain is requested from the DNS server. The DNS server replies back that it is 1.1.1.1, and the malware connects to the malware controller at 1.1.1.1. Then the malware controller sends malicious commands to the infected PC. The PC could have been infected by getting a trojan horse virus, among others. Another example infection method is a drive-by download in which a website is hacked and an exploit is located on that website so visitors to that website are exploited. Virus infection can also occur through email or a variety of other means. A standard Trojan horse virus has a fixed list of domains that it looks up. However, the DGA has an algorithm that generates a new control channel every day, for example. The botnet administrator uses the same algorithm so that if the botnet connects to the bots on Tuesday, for example, the domain that the bots look for on Tuesday has a particular date used in the algorithm. When the ISP determines that the domain is to be placed on the greylist, and the infected PC tries to use the control channel, the DNS responds with a substitute channel, such as 1.2.3.4, for example. Instead of responding with the malware controller channel, the DNS returns an alternate IP address. Instead of checking into the malware, the PC is directed to an alternate server. In an example embodiment, this is referred to as a sinkhole, which is where malicious traffic is directed so it may be analyzed.

FIG. 1 provides system diagram 100 of an example system that a virus uses to control an infected PC. In this example, infected PC 110 has been infected with a virus. The virus on infected PC 110 connects to DNS server 120 to attempt to resolve a hostname, which in an example, would give the botnet control over infected PC 110. DNS server 120 returns, for example, IP address 1.1.1.1 (the address of the malware controller) to infected PC 110. Infected PC 110 then checks in with malware controller 160 at 1.1.1.1. Malware controller 160 then sends malicious commands to infected PC 110.

Figure 2:
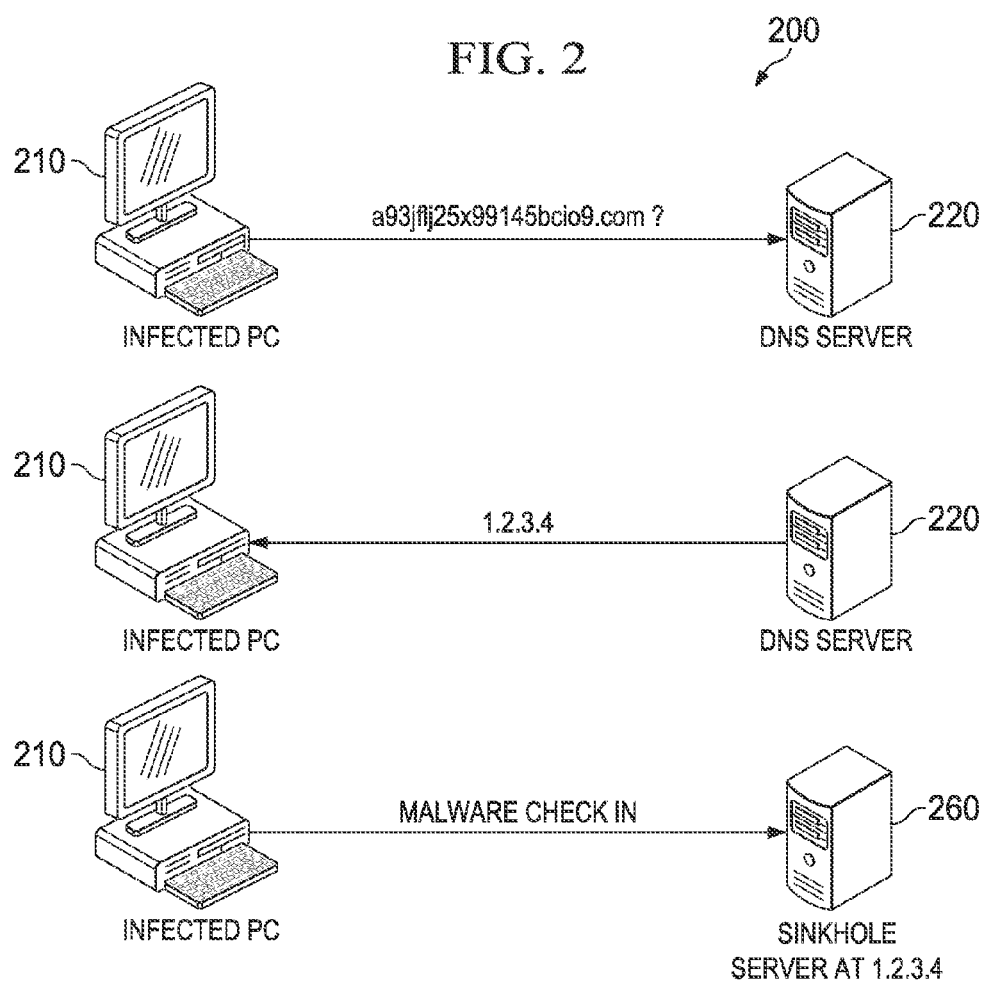
FIG. 2 is a system diagram of an example embodiment of a system of DNS grey listing.

FIG. 2 provides system diagram 200 of a system in which example embodiments of the disclosed systems and methods of DNS grey listing are implemented. Infected PC 210 is infected with a virus, such as a trojan horse virus. The virus on infected PC 210 connects to DNS server 220 to attempt to resolve a hostname, which in an example, would give the botnet control over infected PC 210. DNS server 120 should return, for example, IP address 1.1.1.1 (the address of the malware controller) to infected PC 110. However, using the disclosed systems and methods of DNS grey listing, DNS server returns the address of a sinkhole server, for example, 1.2.3.4 to infected PC 210. The virus on infected PC 210 then checks in with what it thinks is a malware controller. Instead, it connects with the sinkhole server at 1.2.3.4.

Figure 3:
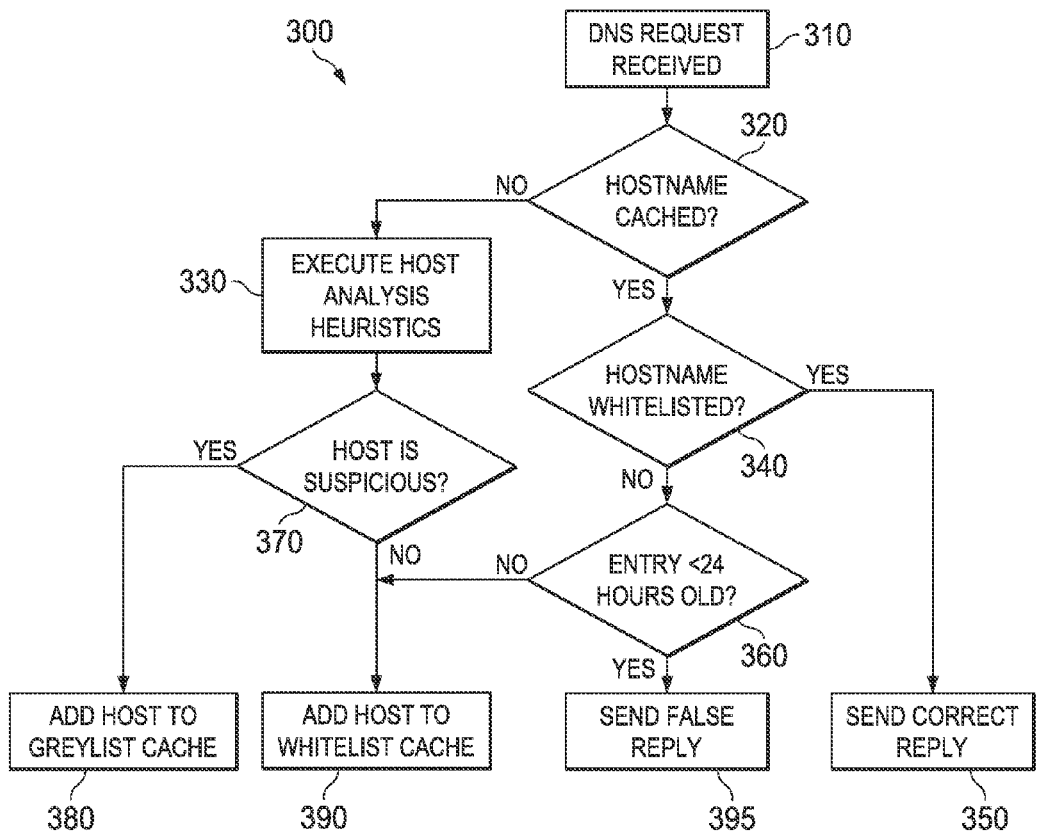
FIG. 3 is a flow diagram of an example embodiment of a method of DNS grey listing.

FIG. 3 provides flowchart 300 of an example embodiment of a method of DNS grey listing. In block 310 a DNS request is received. In block 320, a determination is made as to whether the hostname from the DNS request is cached. If the hostname is not cached in the grey list cache, then in block 330, host analysis heuristics are executed. In block 370, a determination of whether the host is suspicious is made from the heuristics. If the host is determined to be suspicious, then, in block 380, the host is added to the grey list cache. If the host is not suspicious, then in block 390, the host is added to a white list cache.

If, in block 320, the hostname is cached, then, in block 340, a determination is made as to whether the hostname is in a white list cache. If the hostname is in the white list cache, then, in block 350, a correct reply is sent in response to the DNS request. If the host name is not in the white list cache, then it must be in the grey list cache. Then, in block 360, a determination is made as to whether the hostname has been in the grey list cache for less than 24 hours. If the hostname has been in the grey list cache for less than 24 hours, then a false reply is sent in response to the DNS request. If the hostname has been in the grey list cache for at least 24 hours, then the hostname is added to the white list cache in block 390, and a correct reply is sent.

The flow chart of FIG. 3 shows the architecture, functionality, and operation of a possible implementation of DNS grey listing software. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 3 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiments, including the server, can be implemented in hardware, software, firmware, or a combination thereof. In example embodiments, the logic is implemented in software or firmware that is stored in a memory and that is executed by a suitable instruction execution system. The server includes one or more processing units that are operable to execute computer software instructions and to manipulate data according to the computer software instructions. A processor unit can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums. The server further includes, or is communicatively connected to, volatile and non-volatile memory for storing computer software instructions to be executed by the processing unit(s) and for storing and recalling data related to the tags/modules.

Additionally, the server comprises an operating system that controls and manages operation of the server and that includes computer software instructions executed by the server's processing unit(s). The server further comprises a plurality of computer software and data components that cooperatively cause the server to provide DNS grey listing functions. The operating system and computer software and data components, according to example embodiments are stored on or by the server's volatile and/or non-volatile memory. In other embodiments, the computer software and data components, or portions thereof, may be stored on or by device(s) that are not part of the server. The computer software and data components include a grey listing software component having a plurality of computer software instructions that when executed by a processing unit(s) of the server, causes the server to perform according to a grey listing method described hereinabove.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non exhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.]

Although the present disclosure has been described in detail, it should be understood that various changes, substitutions and alterations can be made thereto without departing from the spirit and scope of the disclosure as defined by the appended claims.

Therefore, at least the following is claimed:

1. A method comprising:
  receiving a domain name system (DSN) request comprising a hostname;
  determining if the hostname is in a grey list cache or white list cache; and
  if the hostname is not in the grey list cache or the white list cache, then saving the hostname to the grey list cache and sending a false reply to the DNS request;
  if the hostname is in the grey list cache, then determining if the hostname has been in the grey list cache for less than a predetermined time period; and
  if the hostname has been in the grey list cache for less than the predetermined time period, then sending a false reply to the DNS request.

2. The method of claim 1, wherein the predetermined time period is twenty-four hours.

3. The method of claim 1, further comprising:
  if the hostname has been in the grey list cache for more than the predetermined time period, then sending a correct reply to the DNS request and moving the hostname to the white list cache.

4. The method of claim 1, further comprising:
  if the hostname is not in the grey list cache or the white list cache, then executing analysis heuristics on the hostname.

5. The method of claim 4, further comprising:
  if the host name is determined to not be suspicious from the analysis heuristics, then adding the hostname to the white list cache.

6. The method of claim 1, further comprising if the hostname is saved in the white list cache, then sending a correct reply to the DNS request.

7. A non-transitory computer readable medium comprising computer software for executing instructions for:
  receiving a domain name system (DSN) request comprising a hostname;
  determining if the hostname is in a grey list cache or white list cache; and
  if the hostname is not in the grey list cache or the white list cache, then saving the hostname to the grey list cache and sending a false reply to the DNS request;
  if the hostname is in the grey list cache, then determining if the hostname has been in the grey list cache for less than a predetermined time period; and
  if the hostname has been in the grey list cache for less than the predetermined time period, then sending a false reply to the DNS request.

8. The non-transitory computer readable medium of claim 7, wherein the predetermined time period is twenty-four hours.

9. The non-transitory computer readable medium of claim 7, further comprising instructions for:
  if the hostname has been in the grey list cache for more than the predetermined time period, then sending a correct reply to the DNS request and moving the hostname to the white list cache.

10. The non-transitory computer readable medium of claim 7, further comprising instructions for:
  if the hostname is not in the grey list cache, then executing analysis heuristics on the hostname.

11. The non-transitory computer readable medium of claim 10, further comprising instructions for:
  if the host name is determined to not be suspicious from the analysis heuristics, then adding the hostname to the white list cache.

12. The non-transitory computer readable medium of claim 7, further comprising instructions for:
  if the hostname is saved in the white list cache, then sending a correct reply to the DNS request.

13. A system, comprising:
  a server, the server comprising memory in which are stored instructions for:
  receiving a domain name system (DSN) request comprising a hostname;
  determining if the hostname is in a grey list cache or white list cache; and
  if the hostname is not in the grey list cache or the white list cache, then saving the hostname to the grey list cache and sending a false reply to the DNS request;
  if the hostname is in the grey list cache, then determining if the hostname has been in the grey list cache for less than a predetermined time period; and
  if the hostname has been in the grey list cache for less than the predetermined time period, then sending a false reply to the DNS request.

14. The system of claim 13, wherein the predetermined time period is twenty-four hours.

15. The system of claim 13, further comprising instructions for:
  if the hostname has been in the grey list cache for more than the predetermined time period, then sending a correct reply to the DNS request and moving the hostname to the white list cache.

16. The system of claim 13, further comprising instructions for:
  if the hostname is not in the grey list cache, then executing analysis heuristics on the hostname.

17. The system of claim 16, further comprising instructions for:
  if the host name is determined to not be suspicious from the analysis heuristics, then adding the hostname to the white list cache.

* * * * *